TRANSMISSION WITH CONSTANT SPEED ELECTRIC CLUTCH

Original Filed Dec. 2, 1965 3 Sheets-Sheet 1

INVENTORS
Byron L. Brucken
BY Homer W. Deaton
J. C. Evans
Their Attorney

TRANSMISSION WITH CONSTANT SPEED ELECTRIC CLUTCH

Original Filed Dec. 2, 1965

INVENTORS
Byron L. Brucken
BY Homer W. Deaton
J. C. Evans
Their Attorney

TRANSMISSION WITH CONSTANT SPEED ELECTRIC CLUTCH

Original Filed Dec. 2, 1965

INVENTORS
Byron L. Brucken
BY Homer W. Deaton

J. C. Evans
Their Attorney

United States Patent Office 3,473,638
Patented Oct. 21, 1969

1

3,473,638
TRANSMISSION WITH CONSTANT SPEED ELECTRIC CLUTCH

Byron L. Brucken, Dayton, and Homer W. Deaton, Centerville, Ohio, assignors to General Motors Corporation, Detroit, Mich., a corporation of Delaware Original application Dec. 2, 1965, Ser. No. 511,194, now Patent No. 3,328,983, dated July 4, 1967. Divided and this application May 11, 1967, Ser. No. 637,686
Int. Cl. F16d *67/06, 11/06, 13/22*
U.S. Cl. 192—3.5 4 Claims

ABSTRACT OF THE DISCLOSURE

In preferred form a domestic cleaning appliance including a drive motor, a power transmission having a plurality of self-energizing motion transmitting rollers, a magnetic slip clutch for connecting the drive rollers to the drive motor and a control circuit for controlling the power supply to the coil of the slip clutch for smoothly operating a variably loaded agitator component in the appliance. The control circuit includes a coil wherein a voltage is generated which is proportional to the speed of a driven member. The voltage generated in the coil is processed by semi-conductor means to control the energy level of the magnetic clutch.

This application is a division of Ser. No. 511,194, filed Dec. 2, 1965 and now Patent No. 3,328,983.

This invention is directed to variable speed domestic appliances and more particularly to variable speed domestic appliances utilizing a magnetic slip clutch in the drive mechanism for producing a variable speed operation of a driven component in such appliances.

The development of various types of synthetic materials and fabrics has resulted in a wide range of clothing articles and the like that require hand laundering or like treatment to avoid adversely affecting the basic characteristics of the materials and fabrics. It has been found that single-speed and two-speed domestic washing machines of the type presently marketed today are characterized by clothes washing actions that fail to approximate the gentle washing characteristics of hand laundering and as a result, these machines often are unsuited for washing the fabrics mentioned above. One solution to the problem set forth above is to improve domestic washing machines by the provision therein of a variable speed control mechanism that will operate the agitator and spin tub and like driven components of domestic appliances to approximate hand-type washing operations. In such machines, the variable speed controller is capable of operating the driven components of the machine through a wide range of speeds including very low agitation and spin speed rates.

While variable speed drive washing machines are known, for example, as disclosed in United States Patent No. 3,174,595, issued Mar. 23, 1965, to Brucken, one problem in such machines has been to produce uniformly smooth operating characteristics of the driven components of the machine through a full range of speed settings. For example, one problem has been to maintain a smooth, low-speed drive of an agitator in a domestic washing machine under variable loading conditions placed thereon that are normally encountered as the agitator is reciprocated or oscillated with respect to a load of wet clothes.

An object of the present invention, therefore, is to improve variable speed clothes washers or like domestic appliances by the provision therein of a drive system including a magnetic slip clutch disposed exteriorly of a drive motor and operatively between it and the driven

2 component of a domestic appliance such as an agitator member or the like wherein the clutch is operatively associated with improved speed selector control means for directing a power supply to the clutch and further associated with means for sensing the speed of the clutch and for continually modulating the base energization of the clutch in response to the sensed speed signal to maintain a substantially constant clutch slip to produce a smooth operation of the operative component of the appliance.

Still another object of the present invention is to improve variable speed washing machines or like domestic appliances by the provision therein of driven components associated with power transmitting means including a magnetically operated slip clutch having a coil energized across a transistorized direct-current power supply and wherein means are provided for preselecting a base energization of the clutch coil through the transistorized power supply to establish a predetermined speed output from said clutch and wherein means are provided for controlling the output speed of the clutch in response to variable driven loads.

A further object of the present invention is to improve variable speed washing machines of the type mentioned in the preceding objects wherein the means for controlling the output speed of the clutch includes means for directly sensing the speed of operation of the clutch and responding thereto to continually modulate the base energization of the clutch coil.

A further object of the present invention is to improve variable speed domestic washers or like domestic appliances by the provision therein of a roller drive mechanism and a magnetically operated slip clutch operatively associated with a drive motor and driven components of the domestic appliance wherein the slip clutch is associated with control means including means for preselecting a speed of operation of the driven components of the domestic appliance and means for directly sensing the speed of operation of the clutch to modulate the energization thereof in response to variable, driven loads.

Still another object of the present invention is to improve variable speed domestic appliances by the provision therein of a power transmission including a drive motor having a first output driven at motor speed to drive a predetermined constant load and a second output associated with means for preselecting a speed of operation of the output shaft and additional means for automatically controlling the speed of the output shaft at said predetermined speed in response to variable, driven loads.

Still a further object of the present invention is to improve domestic appliances set forth in the preceding object wherein the means for automatically controlling the speed of the second output includes a transistorized direct-current power supply for directing a predetermined constant, non-cyclic power supply to the clutch and means for sensing the speed of the clutch and for continually modulating the base energization of the clutch in response to a sensed speed signal to maintain a substantially constant clutch slip to produce a smooth operation of the driven portions of the domestic appliance to a wide range of speed settings.

Yet another object of the present invention is to improve a transistorized power supply suitable for association with an energizable slip clutch of a domestic appliance power transmission or the like by the inclusion of voltage divider means in association with one of a pair of transistors to direct a predetermined current flow from the collector of said one transistor to the base of the other of the pair of transistors to improve the responsiveness of the transistor pair to a control signal imposed on said other transistor.

Further objects and advantages of the present invention will be apparent from the following description, reference being had to the accompanying drawings wherein a preferred embodiment of the present invention is clearly shown.

Figure 1:
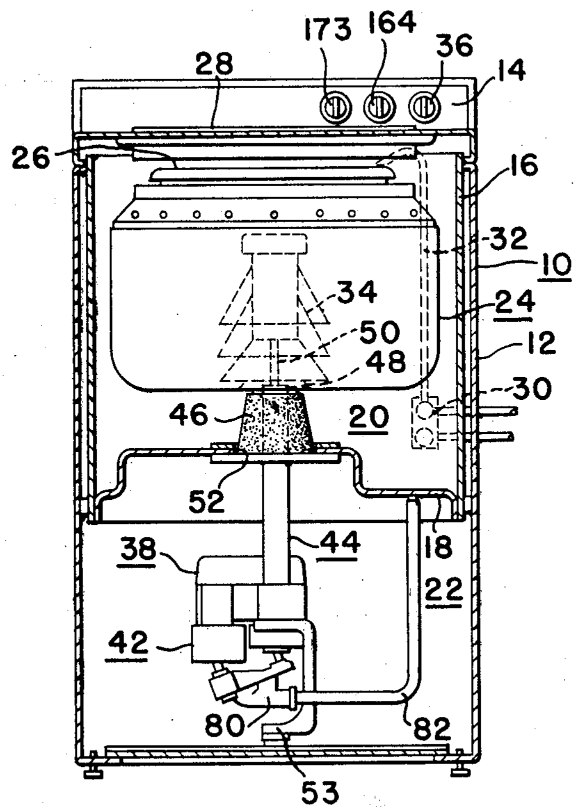
FIGURE 1 is a view in vertical elevation of a domestic appliance including the present invention.

Referring now to FIGURE 1, a clothes washer 10 is illustrated including the present invention. The clothes washer includes an outer casing 12 and a representatively shown rearwardly located control panel 14. Within the outer casing 12 is located a cylindrical water container 16 having a bottom bulkhead 18 that separates a water containing space 20 formed by the cylindrical container 16 from a mechanism compartment or space 22 located therebelow. Within the water containing space 20 is located a rotatable clothes containing spin tub 24 which has a top opening 26 therein located in alignment with a top loading port in the outer casing 12 of the washer that is closed by a suitable closure member 28. The spin tub 24 is associated with a suitable water supply system including a hot and cold water solenoid operated mixing valve 30 connected into a household water supply and to a supply conduit 32 that terminates at a chute overlying the opening 26 into the spin tub 24. Within the tub 24 is located an agitator or pulsator 34 that is adapted to be reciprocated vertically to circulate or agitate the water admitted by the water supply conduit 32. Thus, clothes placed within the tub 24 are washed as the agitating action of the pulsator 34 forces surging toroidal currents of washing fluid and detergent through the fabric. Conventional sequential operating cycle control timer means, shown generally at 36 on the control panel 14, are presettable to selectively admit water through the supply conduit 32 to vertically reciprocate the agitator or pulsator 34 and to spin the tub 24.

In order to obtain the above-described rotation of the spin tub 24 and the reciprocation of the agitator or pulsator 34, an improved drive mechanism 38 is associated therewith including a magnetically operated slip clutch 40 and a roller drive mechanism 42. The roller drive mechanism 42 is suspended from a stationary shaft enclosing housing portion 44 which is connected to a resilient cup-shaped support member 46. The stationary shaft housing portion 44 encloses a spin shaft 48 and an agitator shaft 50. The support member 46, in turn, is connected to the bulkhead 18 through an opening 52 therein which includes a suitable sealing gasket to effect a water-tight seal between the support member 46 and the bulkhead 18. In order to dampen excessive gyrating or surging movement of the lower end of the drive mechanism 38, a snubber device 53 may be used of the type disclosed in copending United States application, Ser. No. 430,266, filed Feb. 4, 1965.

Figure 3:
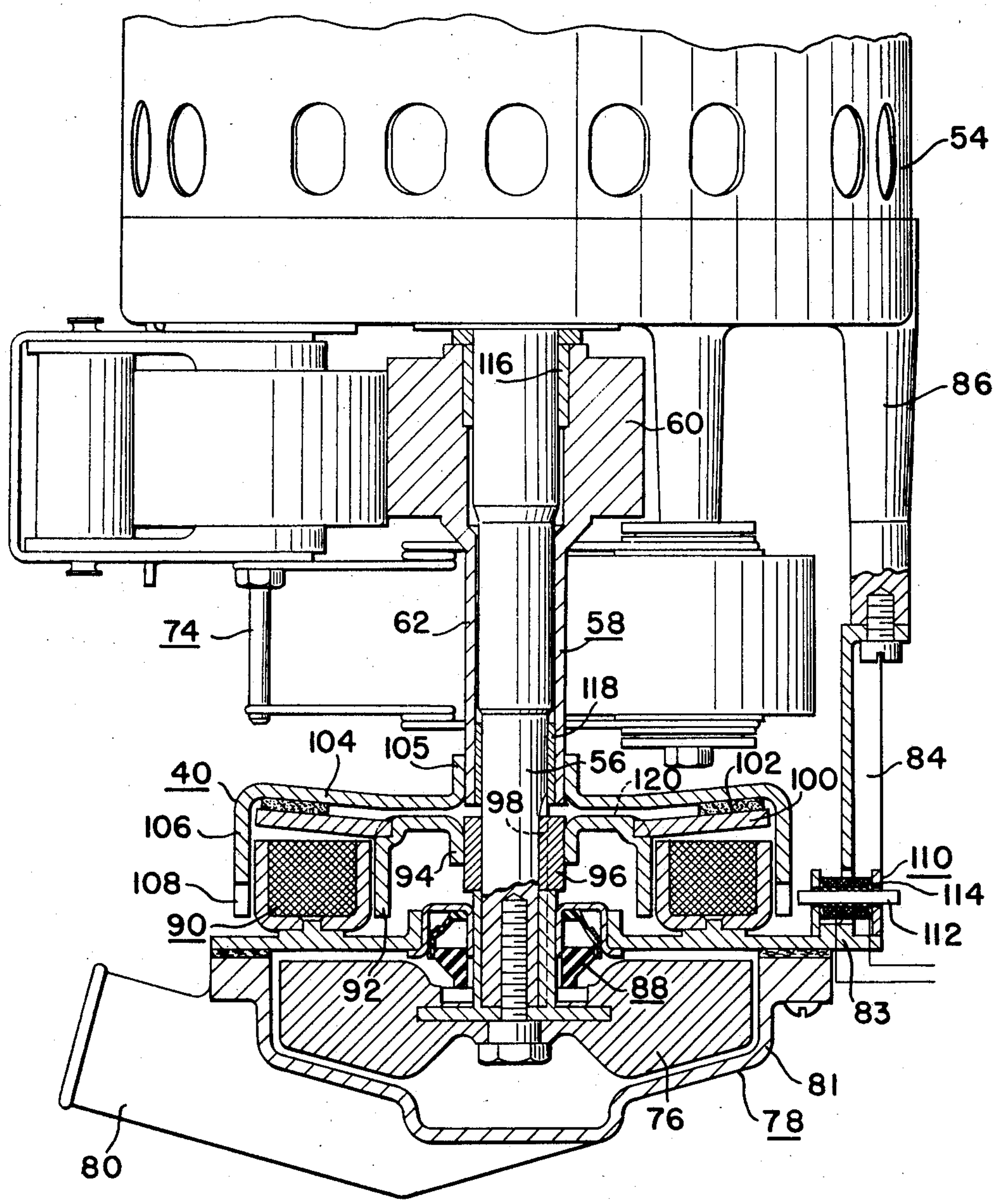
FIGURE 3 is an enlarged view in vertical section of a portion of the drive mechanism of the present invention showing a variably energized magnetic slip clutch and an associated speed pickup.
Figure 4:
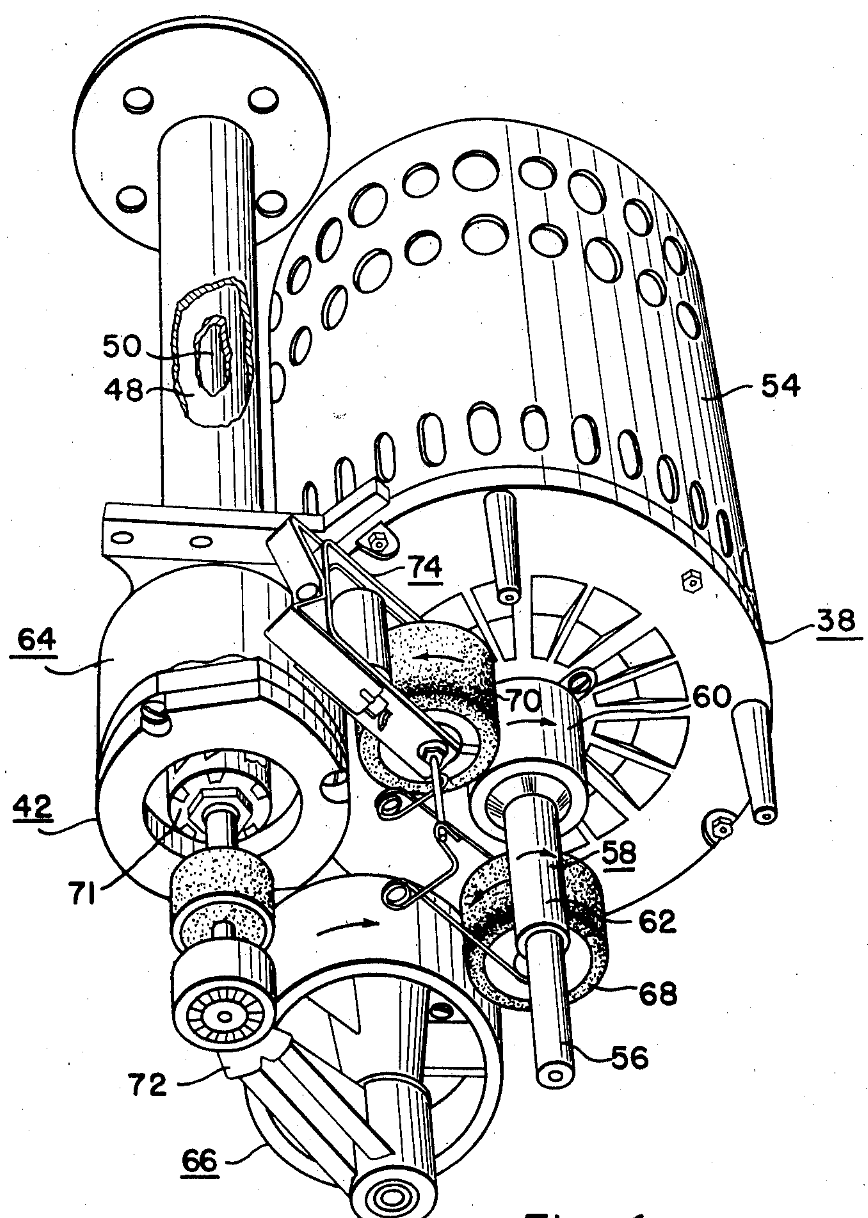
FIGURE 4 is an enlarged view in perspective of the improved drive mechanism showing the drive motor and an associated roller drive mechanism.

Referring now to FIGURE 4, the drive mechanism 38 is shown as including a one-third horsepower, split phase, single-speed 1,725 r.p.m., four-pole reversible motor 54 with a built-in automatic reset type thermal overload protector. The motor 54 has a depending drive shaft 56 operatively connected through the improved slip clutch mechanism 40, as seen in FIGURE 3, to a driven sleeve element 58 having a large diameter spin portion 60 on one end thereof and a reduced diameter agitate portion 62 at the lower end thereof. On the same general plane as the spin drive portion 60 is a spin wheel assembly or spin driven roller means 64 of the type taught in copending United States application, Ser. No. 430,264, filed Nov. 13, 1963, and an agitate wheel or agitate driven roller means 66 lies in the same plane as the agitate drive portion 62 of the driven shaft 58. Interposed between the agitate end portion 62 of the driven sleeve 58 and the agitate wheel assembly 66 is an agitate roller or idler 68 which is spring loaded and laterally floating to make it self-energizing in accordance with the explanation of such mechanism set forth in the United States application, Ser. No. 430,265, filed Feb. 4, 1965, by Brackman et al. Similarly, a self-energizing spin roller or idler 70 lies between the spin drive portion of the driven sleeve 58 and the spin wheel assembly 64. The spin driven roller means 66 is associated with a brake system 71 that is actuated by relative movement set up during deceleration between the roller drive mechanism 42 and the spin tub 24 in a manner more specifically set forth in the United States Patent No. 3,087,321, issued Apr. 30, 1963, to Brucken.

In general, the operation of the motor 54 in the direction of the arrows shown in FIGURE 4 will drive the agitate wheel 66 through the agitate roller 68, this driving motion being translated into reciprocation through a rocker arm assembly 72 more specifically set forth in the above-described Brucken patent. Conversely, when the motor 54 is reversed from the operation shown by the arrows in FIGURE 4, the spin roller 70 will be drawn into a wedging driving connection between the spin drive portion 60 of the driven sleeve 58 and the spin wheel 64 to rotate the spin tub 24 through the spin shaft 48.

In the illustrated arrangement, to prevent scuffing of either the agitate roller 68 or spin roller 70 against the drive sleeve 58 due to overrunning produced during a period when either one of the rollers is not in power train transmitting relationship with the drive force transmitted by the motor 54, a roller retractor device 74 is provided in association therewith of a type more specifically set forth in the above-mentioned copending application of Brackman et al.

Referring now to FIGURE 3, the drive shaft 56 of the motor 54 is shown as being directed through the sleeve 58 and having the lower end thereof secured to an impeller 76 of a drain pump 78 that includes an inlet 80 connected to a conduit 82 in communication with the interior space 20 of the water container 16 and an outlet (not shown) that is adapted to be connected to a suitable drain from the machine 10. The shaft 56 is driven at motor speed and represents a first motor output shaft for driving a constant load represented by the pump 78. The pump 78 has a pump chamber forming casing portion 81 secured to a top cover plate 83 having upwardly directed extensions 84 thereon secured to depending arms 86 off the housing of the motor 54. A suitable seal assembly 88 is disposed about the end of the shaft 56 directed into the pumping chamber of the drain pump 78 to present a water-tight seal between the cover 83 and the shaft 56.

An energizable coil 90 of the magnetically operated slip clutch 40 is secured on the top cover 83 of the pump 78 concentrically of the shaft 56 and driven sleeve 58. Within the coil 90 is located a cup-shaped member 92 of magnetic material having the base thereof turned inwardly at 94 and secured to a key member 96 fit into a groove 98 in the end of the shaft 56. An annular disc member 100 of non-magnetic material has the inner peripheral edge thereof supported by the cup-shaped member 92 in overlying relationship with the coil 90. The disc 100 serves as a support for an annular member 102 of a suitable frictional clutch facing material. Above the friction material carrying disc 100 is located a cup-shaped armature member 104 of the clutch including a radially inwardly located tubular portion 105 fixedly secured to the small diameter end of the driven sleeve 58 and an outer peripheral portion 106 having a plurality of teeth 108 formed on the end thereof. The outer peripheral ring 106 is telescoped over the outer periphery of the coil 90 and is located in close spaced relationship with a speed pickup tachometer 110 that has a permanent magnet portion 112 thereof received within the extension 84 or a like suitable fixed support point to closely align one end of the permanent magnet 112 in close spaced relationship with the teeth 108 on the cup-shaped armature portion 104 of the clutch 40. The speed pickup tachometer further includes a coil 114 around the permanent magnet 112 in which is induced a current generated as the teeth 108 are rotated with respect to the permanent magnet 112.

The sleeve 58 is rotatably supported on the drive shaft 56 at the large diameter or spin drive portion 60 thereof by a bearing 116 and the opposite end thereof likewise is rotatably supported on the drive shaft 56 by a bearing 118. Upon energization of the coil 90, the sleeve 58 and cup-shaped armature member 104 are axially moved along the shaft to produce a frictional engagement of the inner surface of the armature 104 with the annular friction material 102 on the disc member 100 which is being rotated with respect to the armature 104 by the drive shaft 56 of the motor 54. The magnetic flux from the coil 90 passes through a circuit including the cup-shaped member 92 and the armature 104 across an effective air gap 120 between the base of the member 92 and the inner surface of the armature 104. The attractive force of the flux of the coil 90 will vary the frictional engagement between the armature 104 and the rotatable annular friction member 102 so as to produce a predetermined slip between the drive disc 100 and the driven armature 104 whereby the speed of rotation of the axially movable sleeve 58 will vary to a greater or lesser degree so as to vary the speed of the spin tub 24 and agitator or pulser 34 connected to the driven sleeve 58 through the roller drive mechanism previously described. The shaft 56, clutch 40 and sleeve 58 effectively serve as a second output shaft from the motor 54 to drive variable loads represented in the illustrated arrangement by the agitator 34 and the spin tub 24.

Another advantage of the illustrated arrangement of the slip clutch between the drive shaft 56 and the driven sleeve 58 is that the heat generated by the slip clutch 40, in part, is dissipated by conduction through the drain pump 78. Furthermore, the slip clutch 40 is arranged compactly between the drive shaft 56 of the motor 54 and the roller-matic drive mechanism and requires little or no modification to roller drive mechanisms of the type set forth in the previously mentioned Brucken patent.

Figure 2:
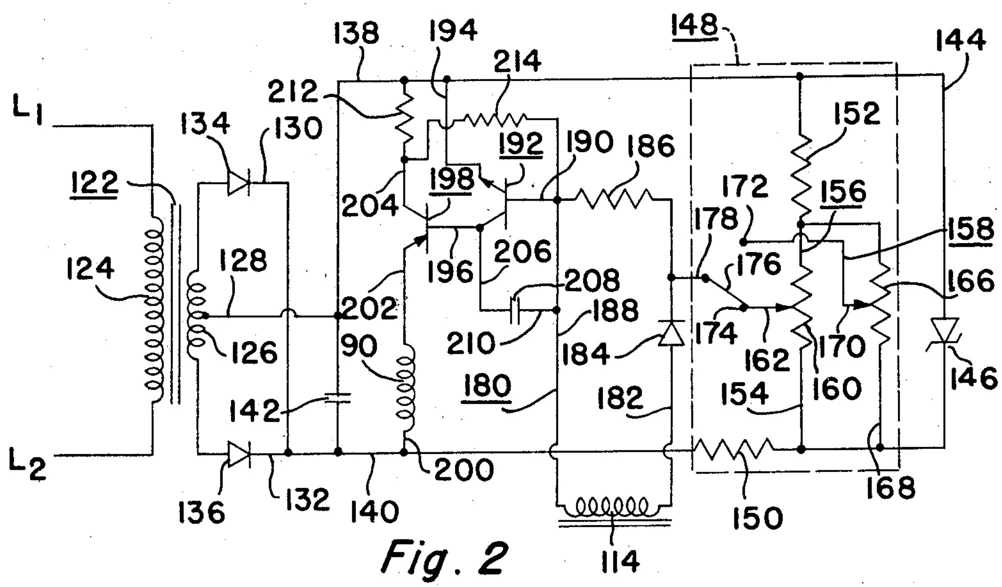
FIGURE 2 is a diagrammatic electrical control circuit in the present invention.

Referring now to FIGURE 2, a control circuit for the energizable coil 90 of the magnetic slip clutch 40 is illustrated as including a step transformer 122 having a primary coil 124 with one end thereof connected to a wire $L_1$ and the opposite end thereof connected to a wire $L_2$. The secondary coil 126 of the transformer 122 is center tapped by a conductor 128 and the ends of the secondary coil 126 are connected to conductors 130, 132, respectively, each of which includes a diode 134, 136 for producing a full wave rectification of the power input through the transformer 122 across conductors 138, 140 constituting a direct-current source of power to the control circuit. A capacitor 142 is connected across the conductors 138, 140 to filter AC pulses from the DC supply. A conductor 144 across the conductors 138, 140 includes a Zener diode 146 for regulating the DC power supply thereacross to a predetermined value.

The control circuit further includes a preprogrammable reference or speed norm network 148 for varying the set speed of the agitator and spin tub in the washing machine 10. The network 148 includes a resistance 150 in the conductor 140 and a resistance 152 connected in a conductor 154 across the conductors 138, 140. The resistances 150, 152 maintain a predetermined voltage across an agitate speed control potentiometer 156 and a spin speed control potentiometer 158. The agitate speed control potentiometer 156 includes a resistance 160 in series with the resistance 152 across the DC power source and a movable contact carrying arm 162 that is connected to a manually adjustable preprogramming agitate speed knob 164 on the control panel 14 of the clothes washer 10. The spin speed potentiometer 158 includes a variable resistance 166 electrically connected across the DC power source in series with the resistance 152 by a conductor 168 and it further includes a movable contact carrying arm 170 that is operatively connected to a manually adjustable preprogramming spin speed knob 173 for presetting a desired spin speed of operation with the knob 173 being located on the control panel 14 adjacent the agitate speed control knob 164.

By varying the positions of the contact carrying arms 162, 170 with respect to the resistances 160, 166, a variable reference potential is maintained at a pair of spaced apart contacts 172, 174 electrically connected to, respectively, the movable contact carrying arms of the spin speed potentiometer 158 and the agitate speed potentiometer 156. The contacts 172, 174 are selectively contacted by a double-throw, single-pole switching arm 176 operated by the timer control 36 during the cycle control operation thereof.

The timer controlled switch 176 is electrically connected to a conductor 178 that connects to a speed pickup signal circuit 180 including the coil 114 of the speed tachometer 110, as seen in FIGURE 3. One side of the coil 114 is electrically connected to a conductor 182 that includes a rectifying diode 184. The conductor 182 also connects to one end of a resistor 186 which has the opposite end thereof electrically connected by a conductor 188 to the opposite side of the coil 114. The speed signal circuit 180 is electrically connected by conductor 190 to the base of a control transistor 192 having its emitter connected by a conductor 194 to the conductor 138. The collector of the transistor 192 is connected by a conductor 196 to the base of a power supply transistor 198. The power supply transistor 198, under the control of the transistor 192, controls the energization of a power circuit including the energizable coil 90 of the slip clutch 40.

More particularly, the power supply circuit for the coil 90 is completed from the conductor 140 through a conductor 200 connected to one side of the coil 90 thence through a conductor 202 connected to the opposite side of the coil 90 which is electrically connected to the emitter of the transistor 198. The collector of the transistor 198 is electrically connected to a conductor 204 that is electrically connected to the conductor 138 whereby, when the power transistor 198 is conductive, noncyclic current of a predetermined steady state value will flow through the transistor 198 from the conductor 140 to the conductor 138 to produce a predetermined frictional drive between the armature 104 and the drive disc 100 of the slip clutch 40.

The control circuit further includes a capacitor feedback circuit from the collector of the control transistor 192 through a conductor 206 which electrically connects to one side of a capacitor 208 that has the opposite side thereof electrically connected by conductor 210 to the conductor 188 of the speed signal circuit 180 thence to the base of the control transistor 192. The capacitor 208 between the base and the collector of the transistor 192 will filter any large magnitude pulses from the speed signal circuit without any appreciable delay in the response of the transistor circuit since the peak voltages of the pulsing signal the rein are balanced across the collector and base of the transistor 192 to offset one another.

A further feature of the illustrated circuit is a voltage divider resistance 212 in the conductor 204 that produces a potential across a resistance 214 that is electrically connected from the conductor 204 to the base of the control transistor 192. The resistance 212 is of a magnitude that will not appreciably reduce the current flow through the coil 90 when it is energized. The resistance of the resistor 212 is sufficient, however, to produce a voltage differential across the resistance 214 to cause a small current flow to the base of the control transistor 192. As current from the collector to the emitter of transistor 198 progressively increases the current flow through the resistor 214 is increased to thereby produce an effective amplification of the control signal for regulating the conductivity of the power supply through the power transistor 198 whereby the pair of transistors 192, 198 are more sensitive to the differential between the control potential at the conductor 178 and the induced potential in the speed signal circuit 180.

By virtue of the above-illustrated arrangement, the washer 10 is conditioned for a control cycle of operation by turning on the timer control 36, and presetting the agitate speed control knob 164 to a desired rate of pulsation and the spin speed control knob 173 to a desired rate of rotation of the spin tub.

When the timer control 36 enters a washing cycle of operation, in the illustrated arrangement, the timer control switch 176 is positioned, as shown in FIGURE 2, to connect the agitate speed potentiometer 156 in the speed signal circuit 180. The movable contact 162 of the agitate speed potentiometer 156 is positioned with respect to the resistance 160 to produce a control voltage at the conductor 178 to produce a predetermined rate of pulsation of the agitator 34.

Initially, as the drive motor 54 is energized to drive the agitator 34, the slip clutch 40 will be driven toward the desired speed necessary to produce the rate of pulsation as established by the agitate speed control 164. Since the clutch 40 is initially off, the speed signal circuit 180 will have a low initial potential induced therein and the control potential from the reference or control circuit 148 will act on the base of the control transistor 192 to condition the power transistor 198 for full conductivity whereby the full potential across the conductors 140, 138 will pass through the coil 90. This causes the movable armature 104 to be drawn axially along the drive shaft 56 into tight engagement with the annular ring of friction material 102 on the drive member 100 of the slip clutch 40. As a result, there is no slip between the drive disc 100 and the driven armature 104 and the driven sleeve 58 will be rotated with respect to the idler roller 68 which is held by the retractor assembly 74 in driving engagement with the sleeve 58. During this phase of operation, the spin idler roller 70 is retracted out of engagement with the driven shaft 58. The drive is transferred from the agitate idler roller 68 thence through the agitate wheel or agitate driven roller means 70 thence through the agitate rocker arm assembly 78 to cause the agitator shaft to pulse at a predetermined rate. As the speed of rotation of the armature 104 approaches the speed required to produce the desired rate of pulsation of the agitator 34, the teeth 108 will move with respect to the magnet 112 of the speed pickup tachometer 110 to induce an AC voltage in the coil 114 that will produce a signal in the circuit 180 that will balance the reference signal established by the preprogrammable reference control circuit 148. As this occurs, the current in the base of the control transistor 192 will drop to cause a commensurate drop in the non-cyclic DC current flow through the power transistor 198 which flow reaches a predetermined base value or steady state condition that causes an energization of the coil 90 whereby the movable armature 104 will be attracted to a predetermined degree against the friction material 102 on the drive disc 100 of the clutch 40 to produce a substantially constant slip therebetween that will maintain a rate of rotation of the driven sleeve 58 necessary to maintain the desired rate of pulsation of the agitator from the roller-matic drive system associated with the driven sleeve 58. The control thereafter continually energizes the coil 90 in a modulated fashion in response to the speed signal to maintain the set speed.

One advantage of the illustrated system is that where agitators of washing machines are like driven components of like domestic appliances are continually subjected to a variable loading, for example, in the illustrated arrangement, the agitator 34 is subjected to a maximum loading both on its upstroke and its downstroke which tends to produce a torque on the agitate shaft 50 of a magnitude to cause the unit to tend to stall with a predetermined slip in the clutch 40. However, as the agitator is subjected to such magnitudes of loading, the increased torque on the agitate shaft 50 will cause an immediate reduction in the speed of the armature 104 of the clutch 40 to cause an immediate reduction in the magnitude of the signal generated in the speed signal circuit 180 by the speed tachometer 110. As a result, the control potential will be increased on the control transistor 192 to immediately increase the conductivity of the power transistor 198 whereby the clutch 40 is conditioned to overcome the increased torque on the agitate shaft 50 whereby the agitator 34 will not be appreciably hindered in its travel by the increased magnitude forces imposed thereon. As a result, the agitator 34 will pulsate very smoothly at or very close to the desired pulsing rate established by manual setting of the agitate control knob 164.

The control transistor 192 and the power transistor 198 are characterized by a high gain that enables the energization of the coil 90 to effect a continual high torque output from the slip clutch 40 until it is closely approximate to the desired control point at which time the controller will respond sharply to back off the coil energization to produce a slip in the clutch to give the desired rate of pulsation set by the manually adjustable agitate speed controller 164. Thus, a small differential between the pickup signal and the reference voltage will condition the transistors 192, 198 to obtain an immediate and substantial change in the energization current through the clutch coil 90. The controller thereby acts as a very sensitive proportioning device to modulate the current through the coil 90 continually in response to increased loading on the agitator to produce a very efficient washing action by the agitator 34.

Following the washing cycle of operation, the timer control 36 conditions the motor 54 and another retractor assembly (not shown) similar to the spin idler retractor 70 to disengage the agitate idler roller 68 from the driven shaft 58 and to move the spin idler roller 70 into driving engagement with the driven sleeve 58. During this phase of operation, the driving action of the motor 54 is transferred from the drive shaft 56 through the slip clutch 40 and the driven sleeve 58 thence through the spin idler roller 70 and the spin drive member 64 to the spin shaft 48 whereby the spin tub 24 is rotated for extracting washing fluid therefrom. The action of the controller during a spin cycle of operation is substantially like that set forth in the agitate or washing cycle of operation. Initially, the motor 54 is conditioned off and the slip clutch 40 is at a rest position. The timer switch 176 is positioned by the timer control 36 to electrically engage the contact 172 whereby a spin speed reference potential is directed through the conductor 178 depending upon the positioning of the spin speed potentiometer 158 by the spin speed control knob 172. This potential will produce a current on the base of the control transistor 192 which then will condition the power transistor 198 to fully energize the coil 90 whereby the armature 104 of the slip clutch 40 will be held in tight engagement with the drive disc 100 thereof to direct the full torque of the motor 54 into the spin portion of the roller drive mechanism 42. The spin tub 24 thereby is brought quickly up to a speed approaching that set by the spin speed control knob 172 and the teeth 108 on the armature 104 will induce a voltage in the speed signal circuit 180 that will bias the reference control potential whereby the control transistor 192 will be conditioned to reduce the conductivity of the power supply transistor 198 to effect an immediate and substantial change in the energization of the clutch 40 back to a base or steady state condition to produce a desired degree of slip between the drive shaft 56 and the driven sleeve 58 to maintain the desired rate of spin rotation in the washer 10. By continually modulating the base energization of the coil 90 in the clutch to effect the spin speed control, the tub conditioned brake 71 of the roller drive system as discussed above is only rendered operative when the motor 54 is de-energized. Otherwise, if the clutch 40 were to be turned on and off during the controlling thereof rather than having the energization of the coil 90 modulated, the brake 71 would become operative to produce an undesirable effect on the operation of the machine during its spin cycle of operation.

It will be appreciated by those skilled in the art from the foregoing explanation of the present invention that applicant has developed an improved infinite speed domestic appliance which in the illustrated washer includes means for selectively controlling the action of an agitating component and a spin tub in an automatic washer wherein an energizable slip clutch is associated with the agitator and spin tub and selectively continually controlled by circuit means including means for presetting the speed of operation of the appliance and for automatically controlling that speed by modulating a predetermined non-cyclic energization of the coil to produce a smooth agitation action through a wide range of control points as well as to closely maintain the rate of rotation of the spin tub at a desired predetermined control point selected from a wide range of control speeds. By virtue of the improved agitation and spin speed action in the washer, the unit is adapted for cleaning a wide variety of fabrics with a gentle hand laundering type agitation and spin action being available for certain delicate fabrics, a more moderate action being available for certain types of wash and wear fabrics and a variety of other control positions necessary to produce adequate cleaning of various heavy-duty fabrics or the like.

Another aspect of the present invention as set forth above is a variable speed domestic appliance including a drive system for attaining the improved variable speed wherein a single motor has a first output shaft for driving a constant load at motor speed and a second output shaft including slip clutch means for varying the speed of the second output shaft by varying the energization of the slip clutch in accordance with variable loads driven by the second shaft as manifested in the illustrated arrangement by a speed pickup signal of the speed of the output of the slip clutch.

While the embodiment of the present invention as herein disclosed constitutes a preferred form, it is to be understood that other forms might be adopted.

What is claimed is as follows:

1. In a variable speed driving mechanism, a driven component having variable loadings, a motor, power transmitting means drivingly connecting said motor to said driven component, said power transmitting means including an energizable magnetic slip clutch including a drive member drivingly connected to said motor and a driven member, a plurality of self-energizing motion transmitting rollers having different moment arms, means for connecting said self-energizing motion transmitting rollers to said driven clutch member, said means for connecting said driven clutch member to said self-energizing motion transmitting rollers including means for selectively transmitting motion to different combinations of rollers to select predetermined different speed ratios between said motor and said driven component, variable speed setting means including semi-conductor switch means for maintaining a predetermined non-cyclic power supply to said slip clutch to establish a predetermined slip therein, means including means for sensing the speed of operation of said driven member of said slip clutch for continually modulating the predetermined non-cyclic energization of said slip clutch to maintain the predetermined degree of slip between said clutch drive member and said clutch driven member to produce a smooth operation of said driven member.

2. In a variable speed driving mechanism, a driven component having variable loadings, a motor, power transmitting means drivingly connecting said motor to said driven component, said power transmitting means including an energizable magnetic slip clutch including a drive member drivingly connected to said motor and a driven member, a plurality of self-energizing motion transmitting rollers having different moment arms, means for connecting said self-energizing motion transmitting rollers to said driven clutch member, said means for connecting said driven clutch member to said self-energizing motion transmitting rollers including means for selectively transmitting motion to different combinations of rollers to select predetermined different speed ratios between said motor and said driven component, variable speed setting means including semi-conductor switch means for maintaining a predetermined non-cyclic power supply to said slip clutch to establish a predetermined slip therein, means including means for sensing the speed of operation of said clutch for continually modulating the predetermined non-cyclic energization of said slip clutch to maintain the predetermined degree of slip between said clutch drive member and said clutch driven member to produce a smooth operation of said driven component means for deriving a control voltage responsive to the speed of said driven member of said clutch, means processing said control voltage for controlling conductivity of said semi-conductor switch means to modulate the non-cyclic energization of the coil of said magnetic clutch means to maintain a predetermined speed norm of operation of said driven component.

3. In a variable speed domestic appliance the combination of, a constant load component, a variable load component, a drive motor operable at a predetermined speed, first output shaft means from said motor for driving said constant load at the motor speed power transmitting means including second shaft output means from said motor for driving said variable load component, means associated with said second shaft means for selecting a predetermined speed of operation of said second shaft means, means for automatically controlling the speed of said second shaft means at said preselected speed in response to variable driven loads including magnetic slip clutch means for transferring power from said motor to said variable load component, and means for sensing the speed of said clutch means for varying the energization thereof in response to variable driven loads to maintain said predetermined set speed of said second shaft means, means for preselecting a variable output speed of said second shaft means including preprogrammable speed norm means for producing a reference potential, said means for automatically controlling the speed of operation of said second shaft means including a transistorized source of direct-current power, means for conditioning said transistorized direct-current power supply by said reference potential to produce a base energization of said magnetic slip clutch means, and means for sensing the speed of operation of said slip clutch means to modulate the base energization of said transistorized source of direct-current power to maintain a substantially constant clutch slip irrespective of variations in the load of said variable load component, said power transmitting means including a plurality of self-energizing motion transmitting rollers having different moment arms, and means associated with said self-energizing motion transmitting rollers for selectively transmitting motion to different combinations of said rollers to select different predetermined speed ratios between said motor and said driven load components.

4. In a variable speed driving mechanism the combination of a constant load component, a variable load component, a drive motor operable at a predetermined speed, first output shaft means from said motor for driving said constant load at the motor speed, second output shaft means from said motor for driving said variable load component, means associated with said second output shaft means for selecting a predetermined speed of operation of said second output shaft means, and means for automatically controlling the speed of said second output shaft means at said preselected speed in response to variable driven loads, said means for selecting a predetermined speed of operation of said second shaft means including a magnetic slip clutch means having an energizable coil for transferring power from said motor to said variable load component, and means for sensing speed of said clutch means for varying the energization thereof in response to variable driven loads to maintain said predetermined set speed of said shaft means, a transistorized D.C. power supply for directing the predetermined non-cyclic power supply through said coil, means for sensing the speed of operation of said magnetic slip clutch, and means for continuous modulation of the non-cyclic energization of said coil in proportion to the speed changes of said variable load component to maintain a substantially constant clutch slip irrespective of variations of the load driven by said second shaft means, said means for continuous modulation of the non-cyclic energization of said coil including a first transistor, a second transistor and means between said first transistor and said second transistor including a coupling capacitor connected to the base and collector electrodes of said second transistor to shunt high frequency transients through the collector and emitter electrodes of said second transistor preventing the high frequency transients from appearing in the base electrode of said second transistor, and first and second feedback resistor means connected to the base electrode of said second transistor, the collector electrode of said first transistor and to each other for feeding back a portion of the energy developed in said first transistor to the base electrode of said second transistor for controlling the base current of said second transistor to improve the instantaneous response of the system.

References Cited

UNITED STATES PATENTS

| | | | |
|---|---|---|---|
| 2,850,654 | 9/1958 | Jaeschke | 310—95 X |
| 2,945,104 | 7/1960 | Jaeschke | 192—84 |
| 3,032,668 | 5/1962 | Robinson et al. | |
| 3,087,321 | 4/1963 | Brucken | 68—23 |
| 3,131,342 | 4/1963 | Wilkerson. | |
| 3,173,041 | 3/1965 | Bancroft | 310—95 |
| 3,207,950 | 9/1965 | Smith | 310—95 X |
| 3,252,022 | 5/1966 | Smith | 192—84 X |

BENJAMIN W. WYCHE III, Primary Examiner

U.S. Cl. X.R.

192—2, 18, 84, 104; 310—95